US006984699B2

(12) United States Patent
Niino

(10) Patent No.: US 6,984,699 B2
(45) Date of Patent: Jan. 10, 2006

(54) BINDER FOR GLASS FIBERS, GLASS FIBERS FOR OLEFIN RESIN REINFORCEMENT, AND PROCESS FOR PRODUCING OLEFIN RESIN COMPOSITION FOR FIBER-REINFORCED MOLDING

(75) Inventor: Yoshiro Niino, Tokyo (JP)

(73) Assignee: Asahi Fiber Glass Co., Ltd., Tokyo (JP)

( * ) Notice: Subject to any disclaimer, the term of this patent is extended or adjusted under 35 U.S.C. 154(b) by 36 days.

(21) Appl. No.: 10/497,550

(22) PCT Filed: Dec. 27, 2002

(86) PCT No.: PCT/JP02/13795

§ 371 (c)(1),
(2), (4) Date: Jun. 14, 2004

(87) PCT Pub. No.: WO03/056095

PCT Pub. Date: Jul. 10, 2003

(65) Prior Publication Data

US 2005/0014906 A1 Jan. 20, 2005

(30) Foreign Application Priority Data

Dec. 27, 2001 (JP) ............................ 2001-396181

(51) Int. Cl.
*C08C 19/22* (2006.01)

(52) U.S. Cl. ................ 525/374; 525/324.4; 525/327.6; 525/379; 525/393; 428/378

(58) Field of Classification Search ............ 525/327.4, 525/327.6, 374, 379, 393; 482/378
See application file for complete search history.

(56) References Cited

U.S. PATENT DOCUMENTS

| | | | | |
|---|---|---|---|---|
| 3,853,605 | A * | 12/1974 | Fahey | 428/378 |
| 4,147,833 | A * | 4/1979 | Eilerman et al. | 428/378 |
| 4,374,177 | A | 2/1983 | Hsu et al. | |
| 5,340,879 | A * | 8/1994 | Audenaert et al. | 525/327.4 |
| 5,728,369 | A | 3/1998 | Griffiths et al. | |
| 2001/0016259 | A1 * | 8/2001 | Campbell et al. | 428/375 |

FOREIGN PATENT DOCUMENTS

| | | |
|---|---|---|
| JP | 59-57931 | 4/1984 |
| JP | 3-80135 | 4/1991 |
| JP | 6-80438 | 3/1994 |
| JP | 6-107442 | 4/1994 |
| JP | 10-131048 | 5/1998 |
| JP | 10-297943 | 11/1998 |

* cited by examiner

*Primary Examiner*—Ling-Sui Choi
(74) *Attorney, Agent, or Firm*—Oblon, Spivak, McClelland, Maier & Neustadt, P.C.

(57) ABSTRACT

This invention provides a sizing composition for glass fibers useful in reinforcing an olefin resin, which comprises at least a) an acid-modified olefin resin which has been neutralized with an amine and b) an amino-containing silane coupling agent. The sizing composition makes it possible to firmly adhere an olefin resin as a matrix resin and the glass fibers with each other and hence, to provide a molding having excellent strength without occurrence of fuzzing on the resin pellets or the molding. This invention also provides glass fibers for olefin resin reinforcement and a production process of an olefin resin composition for fiber-reinforced moldings.

22 Claims, No Drawings

BINDER FOR GLASS FIBERS, GLASS FIBERS FOR OLEFIN RESIN REINFORCEMENT, AND PROCESS FOR PRODUCING OLEFIN RESIN COMPOSITION FOR FIBER-REINFORCED MOLDING

TECHNICAL FIELD

This invention relates to a sizing composition for glass fibers for reinforcing olefin resins (hereinafter simply called "fibers" for the sake of brevity), fibers for olefin resin reinforcement, and a production process of an olefin resin composition for fiber-reinforced moldings.

BACKGROUND ART

Resin compositions, each of which contains an olefin resin such as polyethylene or polypropylene and fibers, are widely used as compositions for obtaining moldings reinforced with fibers. In these compositions, sizing compositions are applied to the surfaces of the fibers to improve the compatibility between the olefin resins and the fibers.

A molding of a fiber-reinforced olefin resin composition can be produced by directly mixing and injection-molding an olefin resin and chopped fiber strands; by kneading, extruding and chopping both of them by an extruder or the like into short fiber pellets in advance and then injection-molding the short fiber pellets; or by causing fibers to run parallel each other, impregnating the fibers with a molten resin, pulling and chopping the thus-impregnated fibers into long fiber pellets, and then injection-molding the long fiber pellets.

However, an olefin resin, for its chemical structure, does not contain polar groups on its molecular chain and is low in surface activity. Even when the olefin resin is formed into pellets as described above, the adhesion of the olefin resin to fibers is poor so that the resulting molding would not be provided with strength improved to such sufficient extent as expected. There is another drawback that fibers tend to become loose and to scatter around from the composition so obtained. Resin compositions for fiber-reinforced moldings, which make use of olefin resins as base resins and have been prepared by pultrusion, involve such problems. It has, therefore, been keenly desired to solve these problems.

To solve such problems, it is proposed, for example, in JP 2,941,320 B to use an olefin resin as a fiber-impregnating matrix resin and a modified olefin resin, which has been subjected to a specific modification, in combination such that, when formed into long fiber pellets, synergistic effects are developed with the treatment of the sizing composition for the fibers and the resulting molding is considerably improved in mechanical strength and the like. This patent publication also discloses to use a modified olefin resin as a component of a sizing composition for glass fibers.

The above-described method, however, involves problems. Upon using the modified olefin resin as a component of a sizing composition, it is necessary to provide the modified olefin resin with water dispersibility and then to apply it to fibers. This requires addition of a neutralizing agent or surfactant to the modified olefin resin. Depending on the treatment method for providing the modified olefin resin with water dispersibility or water solubility, the modified olefin resin may not sufficiently adhere to the surfaces of the fibers so that the method is poor in strand integrity (i.e., the processability of forming fibers into a strand or roving). Therefore, fuzz may be formed on pellets and moldings. When molded as short fiber pellets or long fiber pellets, the resulting molding is provided with inferior mechanical strength.

Objects of the present invention is, therefore, to provide a sizing composition for fibers, which makes it possible to firmly bond an olefin resin as a matrix resin and the fibers with each other and hence, to provide a molding having excellent strength without occurrence of fuzzing on the resin pellets or the molding; and also to fibers for olefin resin reinforcement and a production process of an olefin resin composition for fiber-reinforced moldings.

DISCLOSURE OF THE INVENTION

The present invention provides a sizing composition for glass fibers ("glass fibers" will hereinafter be simply called "fibers") useful in reinforcing an olefin resin, which comprises at least the following components a) and b):

a) an acid-modified olefin resin which has been neutralized with an amine, and b) an amino-containing silane coupling agent.

Preferably, the acid-modified olefin resin may have a number average molecular weight of at least 5,000, the amine may be at least one amine selected from ethylenediamine and morpholine, and the amino-containing silane coupling agent contains as an amino group at least one of primary and secondary amino groups. In the present invention, a fiber strand treated with the above-described sizing composition may preferably be applied with the sizing composition in an amount of from 0.1 to 2.0 wt. % in terms of solids based on the whole weight of the treated fiber strand.

The present invention also provides a production process of an olefin resin composition for long-fiber-reinforced moldings, which comprises impregnating a continuous glass fiber strand, which has been treated with the above-described sizing composition, with a melt of an olefin resin fed to a crosshead from an extruder while pulling the continuous glass fiber strand through the crosshead; and also a production process of an olefin resin composition for short-fiber-reinforced moldings, which comprises kneading chopped strands, which have been formed by chopping a glass fiber strand treated with the above-described sizing composition, with an olefin resin, and then conducting extrusion and chopping. In the production process, the olefin resin may preferably be polypropylene.

According to the present invention, the neutralization of the acid-modified olefin resin, which is a principal component of the sizing composition, with the amine has made it possible to bring about excellent strand integrity, to control fuzzing of the treated fiber strand and, when a resin composition with the treated fibers contained therein is molded, to provide the resulting molding with improved mechanical strength. Presumably, such an amine is lower in the reactivity with acid radicals than sodium hydroxide or potassium hydroxide, another neutralizing agent having relatively strong alkalinity, so that subsequent to the adhesion of the sizing composition to the fibers, the amine is readily liberated from acid radicals, the acid radicals which have become free as a result of the liberation of the amine react with the silane coupling agent to improve the adhesion between the surfaces of the fibers and the olefin resin as the matrix resin.

Different from the present invention described above, it may be contemplated, as an alternative method for rendering the acid-modified olefin resin water-dispersible or water-soluble, to emulsify the acid-modified olefin resin with a surfactant. With a surfactant alone, however, the acid-modified olefin resin can hardly be emulsified or dispersed evenly in water due to the poor hydrophilicity of the acid-modified olefin resin unless the surfactant is used in a large amount. Use of a surfactant in a large amount, however, inhibits excellent adhesion between fibers and a matrix resin.

BEST MODES FOR CARRYING OUT THE INVENTION

The present invention will next be described in further detail based on preferred embodiments. The sizing composition according to the present invention features the inclusion of the acid-modified olefin resin, which has been neutralized with an amine, and the amino-containing silane coupling agent as essential components.

The acid-modified olefin resin for use in the sizing composition according to the present invention can be obtained by such a process as will be described hereinafter. Subsequent to chlorosulfonation of the olefin resin, the chlorosulfone groups can converted into sulfone groups or the olefin resin is directly sulfonated; upon production of the olefin resin, a polymerizable, unsaturated carboxylic acid compound or its derivative can be copolymerized with the olefin; or an addition-polymerizable, unsaturated carboxylic acid or its derivative can be graft-polymerized with the olefin resin.

As the olefin resin to be acid-modified as described above, one selected from olefin homopolymers and copolymers of two or more olefins is usable. Specific examples include polyethylene, polypropylene, polymethylpentene, ethylene-propylene random copolymer, ethylene-propylene block copolymer, ethylene-α-olefin copolymers, and propylene-α-olefin copolymers.

Preferred examples of the sulfonated olefin resin include those obtained by reacting chlorine and sulfur dioxide or chlorosulfonic acid with such olefin resins and converting chlorosulfone groups into sulfone groups; and sulfonated olefin resins obtained by directly sulfonating such olefin resins. More preferred are sulfonated polyethylene and sulfonated polypropylene.

Examples of the acid-modified olefin resin modified with the unsaturated carboxylic acid compound or its derivative include graft polymers obtained by graft-polymerizing unsaturated carboxylic acid compounds or their derivatives on olefin homopolymers or copolymers of two or more olefins, for example, the resins exemplified above as olefin resins; random- or block-polymers obtained by random- or block-polymerizing one or more monomers selected from olefins with one or more compounds selected from unsaturated carboxylic acids or their derivatives; and those obtained by graft-polymerizing unsaturated carboxylic acids or their derivatives on the graft polymers or the random- or block copolymers.

Illustrative of the unsaturated carboxylic acids used for the carboxylic acid modifications are maleic acid, fumaric acid, itaconic acid, acrylic acid, and methacrylic acid. Illustrative of the derivatives of the unsaturated carboxylic acids are anhydrides, esters, amides, imides, metal salts and the like of these acids. Their specific examples include maleic anhydride, itaconic anhydride, methyl acrylate, ethyl acrylate, butyl acrylate, glycidyl acrylate, methyl methacrylate, ethyl methacrylate, glycidyl methacrylate, monoethyl maleate, diethyl maleate, monomethyl fumarate, dimethyl fumarate, acrylamide, methacrylamide, maleic monoamide, maleic diamide, fumaric monoamide, maleimide, N-butylmaleimide, and sodium methacrylate. Among these compounds, those containing no free carboxyl group require to form carboxyl groups by hydrolysis or the like after the polymerization.

Of the above-described unsaturated carboxylic acid compounds and derivatives thereof, preferred are glycidyl acrylate, glycidyl methacrylate and maleic anhydride. Examples of preferred acid-modified olefin resins modified by them include those obtained by graft-polymerizing maleic anhydride on olefin resins containing ethylene and/or propylene as principal resin constituent units; and those acid-modified by copolymerizing olefins, which are composed primarily of ethylene and/or propylene, with glycidyl (meth)acrylate or maleic anhydride.

Such an acid-modified olefin resin may preferably have a number average molecular weight of at least 5,000. A more preferred number average molecular weight is at least 10,000, with a number average molecular weight of from 15,000 to 50,000 being most preferred. A number average molecular weight lower than 5,000 leads to a reduction in strand integrity, and therefore, is too small.

To render such an acid-modified olefin resin water-soluble or water-dispersible, it is essential for the present invention to contain at least an amine in the sizing composition such that radicals of the acid can be neutralized with the amine. Examples of the amine for use in the present invention include ethylenediamine, ammonia, morpholine, diethyltriamine, and hydroxyethylpiperazine. From the standpoint of handling ease and the stability of an aqueous solution or dispersion, use of ethylenediamine, morpholine or ammonia among these amines is preferred, with use of ethylenediamine or morpholine being particularly preferred. Assuming that the quantity of radicals of the acid in the acid-modified olefin resin is 1 (one) equivalent, such an amine may preferably be used at a rate of 0.5 to 1.5 equivalents, with a rate of from 0.8 to 1.2 equivalents being more preferred.

Upon neutralization of the acid-modified olefin resin for use in the sizing composition according to the present invention, an alkali metal hydroxide such as potassium hydroxide or sodium hydroxide can be used as a neutralizing agent in combination with the above-described amine in order to obtain stable water-dispersibility or water-solubility in a compounding tank for the sizing composition and also in an applicator where the sizing composition is applied to a fiber strand. As an alternative, the above-described acid-modified olefin resin may be rendered water-dispersible or water-soluble by using an appropriate amount of a surfactant in combination. No particular limitation is imposed on the surfactant. The above-described acid-modified olefin resin may be contained preferably in an amount of from 50 to 95 wt. %, with 70 to 90 wt. % being more preferred, both based on the total weight of the component a) and the component b). An amount smaller than 50 wt. % leads to inferior compatibility with the matrix resin and hence to a molding having reduced mechanical strength, while an amount greater than 95 wt. % leads to a reduction in the amount of the below-described silane coupling agent. Amounts outside the above-described range are not preferred accordingly.

It is essential for the sizing composition according to the present invention to contain the amino-containing silane coupling agent (aminosilane) in addition to the above-described olefin resin. The silane coupling agent has effects to improve the adhesion between the acid-modified olefin resin and the fibers and also to subsequently improve the adhesion between an olefin resin as a matrix resin and the fibers.

No particular limitation is imposed on the silane coupling agent insofar as it contains one or more amino groups.

Nonetheless, the amino group or groups of the aminosilane can preferably be primary and/or secondary amino group or groups. More preferred are aminosilanes such as γ-aminopropyltriethoxysilane, N-β-(aminoethyl)-γ-aminopropyltrimethoxysilane, N-β-(aminoethyl)-N'-β-(aminoethyl)-γ-aminopropyltrimethoxysilane and γ-anilinopropyltrimethoxysilane. These aminosilanes are considered to have particularly high reactivity with the acid-modified polyolefin in the sizing composition, and are preferred in that they provide improved strand integrity, improved adhesion to the resin and excellent mechanical strength. Use of γ-aminopropyltriethoxysilane is more preferred.

The above-described silane coupling agent may be used preferably in an amount of from 5 to 50 wt. %, with 10 to 30 wt. % being more preferred, both based on the total weight of the component a) and the component b). Use of the silane coupling agent in an unduly small amount leads to insufficient bonding between the fibers and the sizing composition and also insufficient adhesion between the treated fibers and the matrix resin. Use of the silane coupling agent in an excessively large amount, on the other hand, leads to yellowing of a resin composition to be obtained finally. It is, therefore, not preferred to use the silane coupling agent in any amount outside the above-described range.

In addition to the above-described component (a) and component b), the sizing composition can also use a resin—such as a vinyl acetate resin, acrylic resin, polyester resin, polyether resin, phenoxy resin, polyamide resin, epoxy resin or olefin resin, or its modified product—or an oligomer such as a wax led by an olefin resin wax as a resin component in combination. It is, however, common that the above-described resin or oligomer is used in the form of a water dispersion obtained by rendering it water-dispersible with a surfactant or in the form of an aqueous solution obtained by neutralizing or hydrating carboxyl groups or amido groups, which are contained in the backbone structure of the resin or oligomer, to render it water-soluble. To impart lubricating properties to the sizing composition, a lubricant may be incorporated further.

As the lubricant, any lubricant is usable insofar as it is employed in conventional sizing compositions. Preferably usable examples include vegetable waxes such as candelilla wax, carnauba wax and Japan wax; animal waxes such as beeswax, lanolin and spermacet; mineral waxes such as montan wax and petroleum wax; and surfactants such as fatty acid amide surfactants, fatty acid ester surfactants, aromatic ester surfactants, fatty acid ether surfactants and aromatic ether surfactants. This lubricant prevents the adhesion between fibers and a matrix resin if used too much, but cannot bring about sufficient lubricating properties if used in an insufficient amount. When a lubricant is used, it is hence appropriate to add it in an amount of from 0.01 to 0.5 wt. % or so in terms of solids based on the whole sizing composition.

The above-described sizing composition may further contain, in addition to the above-described components, an antistatic agent led by an inorganic salt such as lithium chloride or potassium iodide or a quaternary ammonium such as an ammonium chloride compound or an ammonium ethosulfate compound, or a lubricant led by a surfactant of the aliphatic ester, aliphatic ether, aromatic ester or aromatic ether type.

The sizing composition of the present invention as described above is in the form of an aqueous dispersion or aqueous solution, and its solids concentration may generally range from 0.01 to 0.5 wt. %. When in addition to the above-described component a) and component b), other components are added, it is preferred that, when the total solids amount of the sizing composition including the component a) and component b) is assumed to be 100 parts by weight, the total amount of the component a) and component b) amounts to 50 parts by weight or more.

As the fibers to be treated by the above-described sizing composition in the present invention, those having an average monofilament diameter of from 6 to 23 μm is preferred, with an average monofilament diameter of from 10 to 17 μm being more preferred. An average monofilament diameter of smaller than 6 μm results in costly pellets when the fibers are subsequently impregnated with a matrix resin and the resulting fiber-reinforced resin is pelletized. An average monofilament diameter of greater than 23 μm, on the other hand, results in pellets with inferior mechanical properties. Average monofilament diameters outside the above-described range are not preferred accordingly.

No particular limitation is imposed on the manner of treatment of fibers with the sizing composition according to the present invention. The treatment can be conducted in any appropriate manner.

The sizing composition according to the present invention may preferably be applied in an amount of from 0.1 to 2.0 wt. % in terms of solids based on the whole weight of the fibers with the sizing composition applied thereon. An application amount of less than 0.1 wt. % may not be able to provide sufficient strand integrity and may tend to cause fuzzing, and moreover, may lead to inferior adhesion between the fibers and a matrix resin. Such an unduly small application amount is not preferred accordingly. An application amount of greater than 2.0 wt. %, on the other hand, may result in insufficient spreading of fiber strands upon impregnation with a matrix resin, thereby developing a drawback due to the inclusion of unfibrillated fiber strands in the matrix resin. Such an excessively large application amount is not preferred either.

When an olefin resin composition reinforced with long fibers (long fiber pellets) is produced by impregnating a long fiber strand, which has been treated with the above-described sizing composition, with a matrix resin composed primarily of an olefin resin while pulling the continuous fiber strand, the present invention is particularly effective in that the use of the fiber strand treated with the sizing composition which contains the acid-modified olefin resin makes it possible to enhance the reinforcing effect by the fibers.

In the case of an olefin resin reinforced with short fibers such as chopped strands, in other words, so-called short fiber pellets, on the other hand, a fiber strand treated with a sizing composition which contains an epoxy resin or urethane resin is generally employed, and its reinforcement promoting effect has been recognized. From the use of short fibers such as chopped strands treated with the above-described sizing composition in the present invention, a similar reinforcement promoting effect is also recognized as in the case of the long fiber pellets.

A description will next be made about an olefin resin composition for long-fiber-reinforced moldings, which is composed of a fiber strand treated with the above-described sizing composition and a matrix resin with which the fiber strand is impregnated. As the matrix resin, one composed primarily of an olefin resin is used. Particularly preferred is one composed of an olefin resin as a principal matrix resin and making combined use of a similar acid-modified olefin resin as a principal component of the above-described sizing composition. This matrix resin can synergistically enhance the reinforcing effect by the fibers treated with the above-mentioned, specific sizing composition, thereby providing the resulting molding with considerably improved mechanical strength and the like.

As the olefin resin employed as the matrix resin, any resin selected from homopolymers of olefins and copolymers of two or more olefins can be used as in the case of the above-described olefin resin. Two or more of these olefin resins can also be used in combination. Among these olefin resins, those composed primarily of polyethylene or polypropylene, especially those composed primarily of polypropylene are preferred in the present invention in view of their extrusion processability and moldability, various properties of the resulting resin composition, and the like.

As the modified olefin resin which may preferably be used as a matrix resin in combination with such an olefin resin, any one of the modified olefin resins described in detail as acid-modified olefin resins in the above can be used. Two or more of these acid-modified olefin resins can also be used in combination. When such an acid-modified olefin resin is used in combination with an olefin resin as a matrix resin with which a sized fiber strand is to be impregnated, it is preferred to use the acid-modified olefin resin in a proportion of from 1 to 60 parts by weight relative to 99 to 40 parts by weight of the olefin resin. Coupled with the above-mentioned effect of the treatment of the fiber with the sizing composition, the combined use of the acid-modified olefin resin further improves the impregnability of the fiber strand, which has been treated with the sizing composition, with the matrix resin and the adhesion of the matrix resin with the fibers so that a resin composition capable of affording a molding with considerably improved strength can be obtained. A particularly preferred composition comprises the acid-modified olefin resin in a proportion of from 3 to 20 parts by weight relative to 97 to 80 parts by weight of the olefin resin.

When an olefin resin and an acid-modified olefin resin are used in combination as a matrix resin in the present invention, a combination of an olefin resin and an acid-modified olefin resin, principal resin constituent units of which are the same, is preferred. Specific examples include a combination of polyethylene as a principal component with a copolymer of ethylene and glycidyl methacrylate or an acid-modified ethylene-butene-1 copolymer with maleic anhydride grafted thereon as an auxiliary component (acid-modified olefin resin); and a combination of polypropylene as a principal component with acid-modified polypropylene with maleic anhydride grafted thereon as an auxiliary component. As other examples of polymers preferably usable in combination with olefin resins, chlorinated or chlorosulfonated olefin resins can be mentioned. Proportions and the like of these resins are similar to those of the above-described acid-modified olefin resins.

The long-fiber-reinforced olefin resin composition according to the present invention can be obtained by impregnating the reinforcing continuous fiber strand, which has been treated with the above-mentioned sizing composition, with the above-described matrix resin while pulling the continuous fiber strand. The impregnation can be effected by any appropriated method known to date, and no particular limitation is imposed on the manner of impregnation. The content of the reinforcing fibers in the thus-obtained resin composition may range from 5 to 80 wt. % (based on the composition). A content lower than 5 wt. % cannot exhibit the reinforcing effect of the fibers to sufficient extent, while a content higher than 80 wt. % leads to a substantial deterioration in the processability upon preparing or molding the resin composition and moreover, no further improvement in strength can be practically expected from such an increase in the amount of the fibers. Taking into consideration a balance of reinforcing effect, processability and the like, the preferred content of the fibers may range from 20 to 70 wt. % (based on the composition), with 30 to 65 wt. % (based on the composition) being particularly preferred.

In the long-fiber-reinforced olefin resin composition, it is preferred that the reinforcing fibers each has a length of 2 mm or greater and are arranged substantially parallel to each other. A fiber length shorter than 2 mm cannot be expected to achieve any sufficient improvement in the strength of a molding when the resin composition is molded. Especially to obtain a molding of excellent strength without impairing the injection moldability by subjecting the resin composition to injection molding easy in molding processing and operation, it is preferred to prepare the resin composition as an elongated granular composition in the form of pellets (elongated granules) of 2 to 50 mm in length in which the fibers are arranged with substantially the same length as the pellets.

In such a resin composition according to the present invention, one or more thermoplastic resins may be auxiliary used in combination in small proportions to extents not substantially impairing the objects and effects of the present invention. Further, to impart property or properties as desired in accordance with the application purpose, it is also possible to additionally incorporate known substances commonly added to thermoplastic resins, for example, stabilizers such as antioxidants, heat stabilizers and ultraviolet absorbers, antistatic agents, flame retardants, flame-retardant aids, colorants such as dyes and pigments, lubricants, plasticizers, crystallization accelerators, and nucleating agents. Further, plate-shaped or powdery or granular inorganic compounds such as glass flakes, mica, glass powder, glass beads, talc, clay, alumina, carbon black and wollastonite, whiskers, and the like can also be used in combination.

As a production method of the long-fiber-reinforced olefin resin composition according to the present invention, pultrusion is preferred. Pultrusion basically comprises impregnating a reinforcing continuous fiber strand, which has been treated with the above-described sizing composition, with the above-described matrix resin while pulling the continuous fiber strand. Known protrusion methods include feeding a fiber strand through an impregnating bath filled with an emulsion, suspension or solution of a matrix resin to impregnate the fiber strand with the matrix resin; spraying powder of a matrix resin against a fiber strand or feeding the fiber strand through a tank filled with such powder to have the powder of the matrix resin adhered on the fibers, followed by the melting of the matrix resin to impregnate the fiber strand; and feeding a matrix resin to a crosshead from an extruder to impregnate a fiber strand while feeding the fiber strand through the crosshead.

The impregnating operation with the matrix resin in such protrusion is generally conducted in a single stage, although it may also be conducted in two or more stages. Especially when an olefin resin and an acid-modified olefin resin are used in combination as a matrix resin with which a fiber strand is to be impregnated, the impregnation can be conducted by a single-stage impregnating operation while using a melt of these resins mixed in predetermined proportions, or by dividing an impregnating operation into two or more stages and impregnating in each step the fiber strand with the matrix resin composed of the olefin resin and the acid-modified olefin resin blended in desired proportions such that the desired resin composition is obtained finally.

In the present invention, melt kneading can also be used upon producing such a resin composition. Melt kneading is to knead a matrix resin in a molten state and sized fiber strands in an extruder. Melt kneading methods include melting the matrix resin in a twin-screw extruder and feeding the fiber strand, which has been treated with the sizing composition, through a feed opening arranged at an intermediate point; and melting and kneading the matrix resin, which has been pre-blended beforehand in a twin-screw or single-screw extruder, and the fiber strand which has been treated with the sizing composition. As the form of the fiber strand treated with the sizing composition, the fiber strand is often used in the form of chopped strands which are of the type chopped beforehand although it can be used in the form of the continuous fiber strand.

Further, as a matrix resin with which a sized fiber strand is to be impregnated, an olefin resin and an unsaturated carboxylic acid or its derivative may be subjected together with an organic peroxide to melt kneading. Using the thus-prepared matrix resin, a fiber strand which has been treated with the sizing composition may then be impregnated to effect a reaction between a portion of the olefin resin and the unsaturated carboxylic acid or its derivative.

In the production process of the resin composition of the present invention by the use of pultrusion or kneaded molding as described above, the temperature of the molten matrix resin with which the fiber strand is to be impregnated can be set preferably at 180 to 320° C. This temperature range is particularly preferred especially when one composed primarily of polypropylene is used as an olefin resin.

No particular limitation is imposed on the shape of the resin composition of the present invention obtained as described above. The resin composition can be in any desired form such as a strand, sheet, plate or pellets obtained by cutting the strand into appropriate lengths. Especially to permit an application to injection molding which is easy in molding and processing, it is preferred to form the resin composition into an elongated granular composition of from 2 to 50 mm in length. Upon molding such a resin composition, it is preferred to form the resin composition into a molding such that, after the resin composition has been molded, the fibers treated with the sizing composition are dispersed with a weight-average fiber length of 1 mm or longer. This makes it possible to provide the molding with a high degree of mechanical strength.

EXAMPLES

The present invention will next be described specifically based on examples and comparative examples.

Example 1

A sizing agent (aqueous dispersion) was prepared using 0.5 wt. % in terms of solids of γ-aminopropyltriethoxysilane and 3.0 wt. % in terms of solids of an emulsion of polypropylene modified with maleic acid (number-average molecular weight: 15,000, ethylenediamine-neutralized product), and was evenly coated on surfaces of fibers of 13 μm in diameter. After the fibers were formed into a strand, the strand was chopped in 3 mm lengths and dried to produce chopped strands.

Properties of the chopped strands were measured by the methods to be described hereinafter. The measurement results will be presented below in Table 1.

Ignition loss (wt. %): JIS R 3420 was followed.

Blend value (g): Measured in accordance with the ASAHI FIBER GLASS measuring method. Amount of fuzz formed upon mixing 3 kg of a sample for 15 minutes in a twin-cylinder blender.

Percent monofilaments (wt. %): Measured in accordance with the ASAHI FIBERGLASS measuring method. Percentage of thin filaments contained in chopped strands.

Bulk specific gravity: Measured in accordance with the ASAHI FIBER GLASS measuring method. Free-falling bulk specific gravity.

Next, the chopped strands (30 parts by weight), polypropylene resin (69 parts by weight) and a polypropylene resin modified with maleic anhydride (1 part by weight) were molten and mixed in an extruder, extruded in the form of wires, and subsequent to cooling, chopped in 3 mm lengths to prepare short-fiber-reinforced polypropylene resin pellets (FR-PP). The short-fiber-reinforced polypropylene resin pellets were then molded into various specimens by an injection molding machine.

<Strand Integrity (Overall Ranking)>

Ranking Methods

Examples 1–3 & Comparative Example 1–4 (Chopped Strands)

While taking into consideration the degrees of fuzz formation upon production of a glass fiber strand and a resin composition, the overall ranking of fuzzing was performed based on the measurement results of blend value and percent monofilaments. The following ranking standards were relied upon.

Ranking Standards

| Chopped standards | | |
|---|---|---|
| Level | Blend value (g) | Percent monofilaments (wt. %) |
| 1 | Less than 5 | Less than 0.05 |
| 2 | 5 to less than 20 | 0.05 to less than 0.1 |
| 3 | 20 to less than 100 | 0.1 to less than 0.5 |
| 4 | 100 or greater | 0.5 or greater |

In the ranking of the strand integrity based on the blend value and percent monofilaments, A: Both of the blend value and the percent monofilaments meet Level 1.

B: One of the blend value and the percent monofilaments is Level 1, and the other is Level 2.

C: One of the blend value and the percent monofilaments is Level 3, and the other is Level 4.

D: Both of the blend value and the percent monofilaments meet Level 4.

Example 4 & Comparative Examples 5–8 (Rovings)

While taking into consideration the degrees of fuzz formation upon production of a glass fiber strand and a resin composition, the overall ranking of fuzzing was performed based on the measurement results of blend value and percent monofilaments. The following ranking standards were relied upon.

Ranking Standards

| | Rovings |
|---|---|
| | Amount of fuzz formed on winder (mg) |
| A | 0 to less than 50 |
| B | 50 to less than 100 |
| C | 100 to less than 200 |
| D | 200 or more |

Definitions of the Ranks

A: Upon production of a resin composition, substantially no fuzzing is recognized on chopped strands or a roving, and B: Upon production of a resin composition, some fuzzing is recognized on chopped strands or a roving, but the production is feasible without any problem.

C: Upon production of a resin composition, fuzzing occurs on chopped strands or a roving. During molding of short fiber pellets, a feeder and the like are blocked with fuzz balls in a short time so that no long-time, continuous extrusion is feasible. During molding of roving fiber pellets, on the other hand, end breakages of rovings take place, resulting in low productivity.

D: Upon production of chopped strands or rovings, fuzz is formed, resulting in a low production efficiency of chopped strands or a difficulty in paying out filaments due to their entanglements or the like in the production of the rovings.

<Physical Properties of FR-PP>

Tensile strength (MPa): JIS K 7113 was followed.

Izod impact strength ($kJ/m^2$): JIS K 7110 was followed.

Example 2

Chopped strands were produced in a similar manner as in Example 1 except that the emulsion of the polypropylene modified with maleic acid was a morpholine-neutralized product, and their ranking was performed by similar methods as described above. The measurement results are presented in Table 1.

Example 3

Chopped strands were produced in a similar manner as in Example 1 except that the polypropylene resin used in the employed emulsion of the polypropylene modified with maleic acid had a number-average molecular weight was 4,500, and their ranking was performed by similar methods as described above. The measurement results are presented in Table 1.

Comparative Example 1

Chopped strands were produced in a similar manner as in Example 3 except that γ-glycidoxypropyltrimethoxysilane was used as a silane coupling agent, and their ranking was performed by similar methods as described above. The measurement results are presented in Table 1.

Comparative Example 2

Chopped strands were produced in a similar manner as in Example 1 except that the emulsion of the polypropylene modified with maleic acid was a KOH-neutralized product, and their ranking was performed by similar methods as described above. The measurement results are presented in Table 1.

Comparative Example 3

Chopped strands were produced in a similar manner as in Example 3 except that the emulsion of the polypropylene modified with maleic acid was a KOH-neutralized product, and their ranking was performed by similar methods as described above. The measurement results are presented in Table 1.

Comparative Example 4

Chopped strands were produced in a similar manner as in Comparative Example 3 except that γ-glycidoxypropyltrimethoxysilane was used as a silane coupling agent, and their ranking was performed by similar methods as described above. The measurement results are presented in Table 1.

TABLE 1

| | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|
| Silane coupling agent | *1 | *1 | *1 | *2 | *1 | *1 | *2 |
| Polypropylene emulsion | | | | | | | |
| Number-average molecular weight | 15,000 | 15,000 | 4,500 | 4,500 | 15,000 | 4,500 | 4,500 |
| Neutralizing agent | Ethylene-diamine | Morpho-line | Ethylene-diamine | Ethylene-diamine | KOH | KOH | KOH |
| Properties of chopped strands | | | | | | | |
| Ignition loss (wt. %) | 0.43 | 0.41 | 0.50 | 0.42 | 0.39 | 0.39 | 0.41 |
| Blend value (g) | 0.5 | 2.3 | 10.1 | 840 | 35.6 | 910 | 920 |
| Percent monofilaments (wt. %) | 0.01 | 0.01 | 0.03 | 0.51 | 0.05 | 0.69 | 0.54 |
| Bulk specific gravity | 0.71 | 0.70 | 0.67 | 0.57 | 0.67 | 0.52 | 0.51 |
| Strand integrity (overall ranking) | A | A | B | D | C | D | D |
| Physical properties of FR-PP | | | | | | | |
| Tensile strength (MPa) | 88 | 89 | 87 | 60 | 85 | 58 | 58 |
| IZOD impact strength ($kJ/m^2$) | 9.0 | 8.8 | 8.5 | 5.7 | 8.3 | 5.5 | 5.5 |

Ignition loss: Solids content (wt. %) of the sizing composition based on the whole glass fibers including the sizing composition.

*1: γ-Aminopropylethoxysilane

*2: γ-Glycidoxypropyltrimethoxysilane

Example 4

A sizing agent (aqueous dispersion) was prepared using 0.5 wt. % in terms of solids of γ-aminopropyltriethoxysilane and 3.0 wt. % in terms of solids of an emulsion of polypropylene modified with maleic acid (number-average molecular weight: 25,000, ethylenediamine-neutralized product), and was evenly coated on surfaces of fibers of 16 μm in diameter. After the fibers (4,000 fibers) were gathered into a bundle, the bundle was dried to prepare a roving. Properties of the roving was measured by the methods to be described hereinafter. The measurement results are presented in Table 2.

Ignition loss (wt. %): JIS R 3420 was followed.

Amount of fuzz formed on winder (mg): Measured in accordance with the ASAHI FIBER GLASS measuring method. Amount of fuzz formed when a roving was wound up under tension.

Next, polypropylene resin (95 parts by weight) and polypropylene resin modified with maleic anhydride (5 parts by weight) were blended and molten. Using an impregnation die, the roving is introduced into the molten resin. While taking up the thus-coated roving, it was cooled and chopped in 6 mm lengths to prepare long-fiber-reinforced polypropylene resin pellets. The long-fiber-reinforced polypropylene resin pellets were then molded into various specimens by an injection molding machine. The fiber content was controlled at 40 wt. %.

Comparative Example 5

A roving was produced in a similar manner as in Example 4 except that γ-glycidoxypropyltrimethoxysilane was used as a silane coupling agent, and its ranking was performed by similar methods as described above. The measurement results are presented in Table 2.

Comparative Example 6

A roving was produced in a similar manner as in Example 4 except that the polypropylene resin used in the employed emulsion of the polypropylene modified with maleic acid had a number-average molecular weight was 15,000 and the polypropylene modified with maleic acid was in the form of a KOH-neutralized product, and its ranking was performed by similar methods as described above. The measurement results are presented in Table 2.

Comparative Example 7

A roving was produced in a similar manner as in Comparative Example 6 except that the polypropylene resin used in the employed emulsion of the polypropylene modified with maleic acid had a number-average molecular weight was 4,500, and its ranking was performed by similar methods as described above. The measurement results are presented in Table 2.

Comparative Example 8

A roving was produced in a similar manner as in Comparative Example 7 except that γ-glycidoxypropyltrimethoxysilane was used as a silane coupling agent, and its ranking was performed by similar methods as described above. The measurement results are presented in Table 2.

TABLE 2

| | Ex. 4 | Comp. Ex. 5 | Comp. Ex. 6 | Comp. Ex. 7 | Comp. Ex. 8 |
|---|---|---|---|---|---|
| Silane coupling agent | *1 | *2 | *1 | *1 | *2 |
| Polypropylene emulsion | | | | | |
| Number-average molecular weight | 25,000 | 25,000 | 15,000 | 4,500 | 4,500 |
| Neutralizing agent | Ethylene-diamine | Ethylene-diamine | KOH | KOH | KOH |
| Properties of chopped strands | | | | | |
| Ignition loss (wt. %) | 0.35 | 0.33 | 0.34 | 0.34 | 0.32 |
| Amount of fuzz formed on winder (mg) | 23 | 148 | 158 | 139 | 215 |
| Strand integrity (overall ranking) | A | C | C | C | D |
| Physical properties of FR-PP | | | | | |
| Tensile strength (MPa) | 121 | 104 | 120 | 115 | 95 |
| IZOD impact strength (kJ/m$^2$) | 46 | 38 | 44 | 40 | 34 |

Ignition loss: Solids content (wt. %) of the sizing composition based on the whole glass fibers including the sizing composition.
*1: γ-Aminopropylethoxysilane
*2: γ-Glycidoxypropyltrimethoxysilane In Examples 1–4 where the amine-neutralized, acid-modified olefin resin was used as a sizing agent for the fibers, the strand integrity for the fibers was good and no fuzzing was observed. In Comparative Examples 1, 4, 5 and 7–8 where γ-glycidoxypropyltrimethoxysilane was used as a silane coupling agent, however, the strand integrity for the fibers and the mechanical strength of FR-PP were inferior. In Comparative Examples 2–4 and Comparative Examples 6–8 where the acid-modified olefin resin was used without neutralization with any amine, on the other hand, the strand integrity was inferior and substantial occurrence of fuzz was observed.

INDUSTRIAL APPLICABILITY

The present invention as described above can provide a sizing agent for fibers, which allows an olefin resin and fibers to firmly adhere with each other and provides a molding having excellent strength without occurrence of fuzzing on resin pellets or the molding. This present invention can also provides fibers for olefin resin reinforcement and an olefin resin composition for fiber-reinforced moldings.

What is claimed is:

1. A sizing composition comprising:
- a) an acid-modified olefin resin having a number average molecular weight of 10,000–50,000 which has been neutralized with ethylenediamine, and
- b) γ-aminopropyltriethoxysilane.

2. The sizing composition as claimed in claim 1, wherein said acid-modified olefin resin is obtained by
- chlorosulfonating an olefin resin to obtain one or more chlorosulfone groups, and then converting said one or more chlorosulfone groups into one or more sulfone groups; or
- sulfonating an olefin resin; or
- copolymerizing a polymerizable, unsaturated carboxylic acid compound or a derivative thereof with an olefin resin; or
- graft-polymerizing an addition-polymerizable, unsaturated carboxylic acid compound or a derivative thereof with an olefin resin.

3. The sizing composition as claimed in claim 1, wherein said acid-modified olefin resin is a sulfonated polyethylene, a sulfonated polypropylene, or mixtures thereof.

4. The sizing composition as claimed in claim 2, wherein said acid-modified olefin resin is obtained by
- said copolymerizing or said graft-polymerizing; wherein
- said unsaturated carboxylic acid compound is at least one selected from the group consisting of maleic acid, fumaric acid, itaconic acid, acrylic acid, and methacrylic acid; and
- said derivative is an anhydride, ester, amide, imide, metal salt, or mixtures thereof of said unsaturated carboxylic acid.

5. The sizing composition as claimed in claim 4, wherein said unsaturated carboxylic acid compound is selected from the group consisting of glycidyl acrylate, glycidyl methacrylate, and maleic anhydride.

6. The sizing composition as claimed in claim 1, wherein said acid-modified olefin resin is neutralized with an alkali metal hydroxide in addition to said ethylenediamine.

7. The sizing composition as claimed in claim 1, wherein said sizing composition further comprises a surfactant.

8. The sizing composition as claimed in claim 1, wherein said silane coupling agent is present in an amount of 10–30 wt. % acid-modified olefin resin based on total weight of component a) and b).

9. The sizing composition as claimed in claim 8, wherein said sizing composition comprises 70–90 wt. % of said acid-modified olefin resin based on total weight of component a) and b).

10. The sizing composition as claimed in claim 1, further comprising a lubricant.

11. The sizing composition as claimed in claim 1, further comprising an anti-static agent.

12. The sizing composition as claimed in claim 1, wherein said sizing composition is in the form of an aqueous dispersion or aqueous solution having a solids concentration of 0.01 to 0.5 wt %.

13. The sizing composition as claimed in claim 1, wherein said acid-modified olefin resin has a number average molecular weight of 10,000–15,000.

14. The sizing composition as claimed in claim 1, wherein said acid-modified olefin resin has a number average molecular weight of 10,000–25,000.

15. The sizing composition as claimed in claim 1, wherein said acid-modified olefin resin has a number average molecular weight of 15,000–25,000.

16. The sizing composition as claimed in claim 1, wherein said acid-modified olefin resin has a number average molecular weight of 15,000–50,000.

17. The sizing composition as claimed in claim 1, wherein said acid-modified olefin resin has a number average molecular weight of 25,000–50,000.

18. A process for producing an olefin resin composition, said method comprising:
- impregnating a continuous glass fiber strand, which has been treated with a sizing composition according to claim 1, with a melt of an olefin resin fed to a crosshead from an extruder while pulling said continuous glass fiber strand through said crosshead.

19. A process for producing an olefin resin composition, said method comprising:
- kneading chopped strands, which have been formed by chopping a glass fiber strand treated with a sizing composition according to claim 1, with an olefin resin into a mass,
- extruding said mass into wires, and then
- chopping said wires.

20. The process according to claim 18, wherein said olefin resin is polypropylene.

21. The process according to claim 19, wherein said olefin resin is polypropylene.

22. Glass fibers comprising a sizing composition according to claim 1, applied in an amount of from 0.1 to 2.0 wt. % in terms of solids based on a whole weight of said glass fibers and said sizing composition.

* * * * *